United States Patent [19]
Hill

[11] 3,798,899
[45] Mar. 26, 1974

[54] GAS TURBINE ENGINE
[75] Inventor: Charles C. Hill, La Jolla, Calif.
[73] Assignee: Power Technology Corporation, Bloomfield Hills, Mich.
[22] Filed: Dec. 29, 1971
[21] Appl. No.: 213,346

[52] U.S. Cl............... 60/39.02, 60/39.32, 60/39.36, 415/1, 415/174
[51] Int. Cl........................... F02c 3/06, F01d 11/08
[58] Field of Search............ 60/39.31, 39.32, 39.36, 60/39.02; 415/170, 174, 134–137, 1; 277/53, 173

[56] References Cited
UNITED STATES PATENTS
| | | | |
|---|---|---|---|
| 3,085,398 | 4/1963 | Ingleson | 60/39.32 |
| 2,927,724 | 3/1960 | Wardle | 415/174 X |
| 2,427,244 | 9/1947 | Warner | 415/136 |
| 3,146,992 | 9/1964 | Farrell | 415/136 X |

FOREIGN PATENTS OR APPLICATIONS
856,599  12/1960  Great Britain............... 415/174

Primary Examiner—Carlton R. Croyle
Assistant Examiner—Robert E. Garrett
Attorney, Agent, or Firm—Barnes, Kisselle, Raisch & Choate

[57] ABSTRACT

A gas turbine engine including a compressor, a burner and a turbine. The turbine includes a stator, a rotor and a shroud about the periphery of the rotor. Means are provided for supporting the shroud in floating relation to the rotor and for applying a load thereto to hold the shroud in adjusted relation to the rotor when the rotor achieves a predetermined speed.

8 Claims, 3 Drawing Figures

3,798,899

Patented Mar 26 1974

INVENTOR.
CHARLES C. HILL
BY
Barnes, Kisselle, Raisch & Choate
ATTORNEYS

GAS TURBINE ENGINE

This invention relates to gas turbine engines.

BACKGROUND OF THE INVENTION

In gas turbine engines, in order to achieve maximum efficiency, a shroud is provided about the periphery of the rotor of the engine. For maximum efficiency, the clearance between the shroud and the rotor is kept at a minimum. In the manufacture of a gas turbine engine, the formation of the shroud and its concentricity to the rotor is a major problem.

Accordingly, among the objects of the invention are to provide a gas turbine engine which has a novel shroud construction; wherein the shroud is supported in a manner to adjust to the concentricity of the rotor; and wherein the shroud is locked in adjusted concentric relation to the rotor at high speeds.

SUMMARY OF THE INVENTION

A gas turbine engine including a compressor, a burner and a turbine. The turbine includes a stator, a rotor and a shroud about the periphery of the rotor. Means are provided for supporting the shroud in floating relation to the rotor and for applying a load thereto to hold the shroud in adjusted relation to the rotor when the rotor achieves a predetermined speed.

DESCRIPTION

Figure 1:
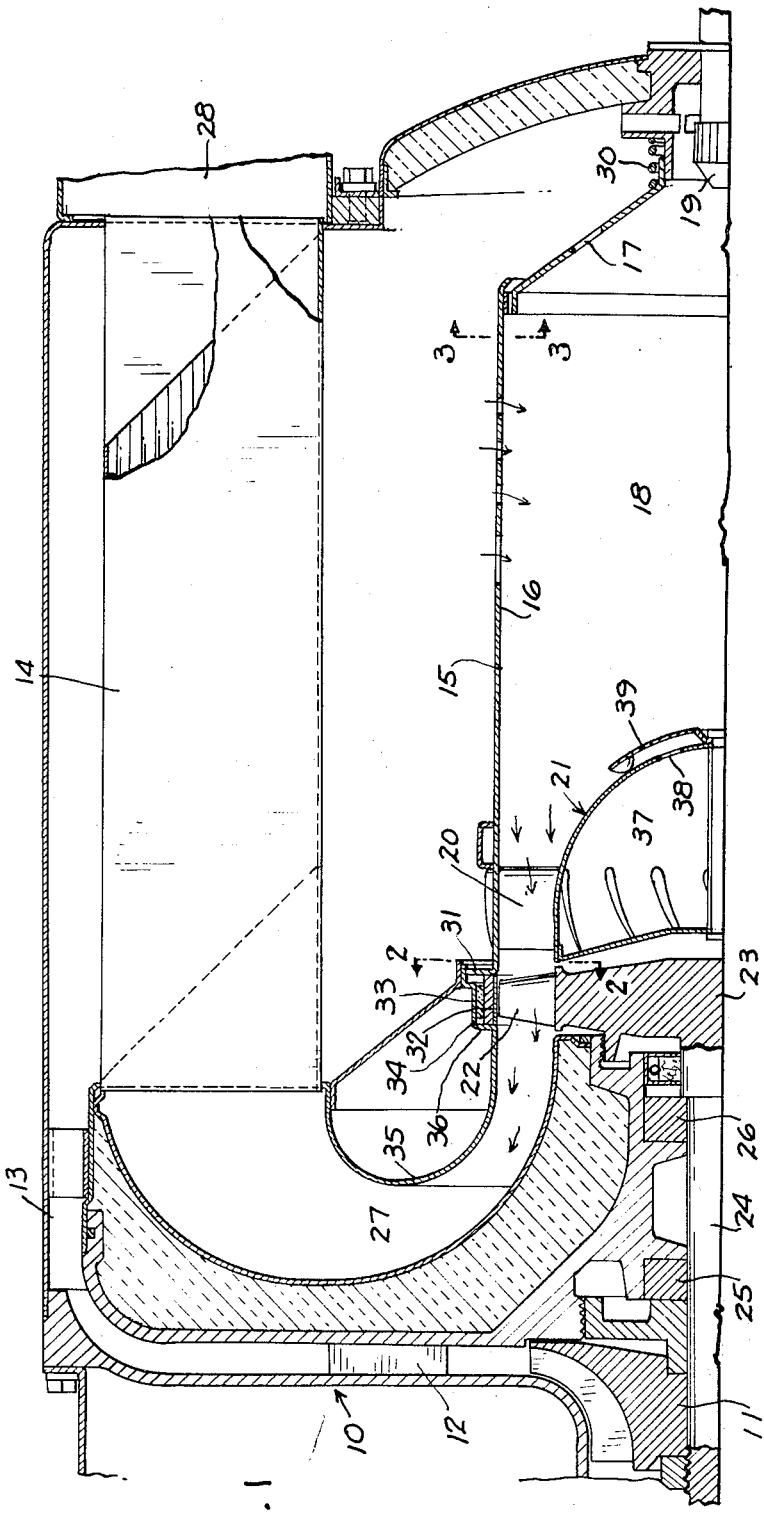
FIG. 1 is a fragmentary longitudinal sectional view of a turbine embodying the invention.
Figure 3:
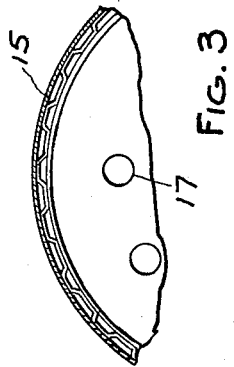
FIG. 3 is a fragmentary sectional view on an enlarged scale taken along the line 3—3 in FIG. 1.
Figure 2:
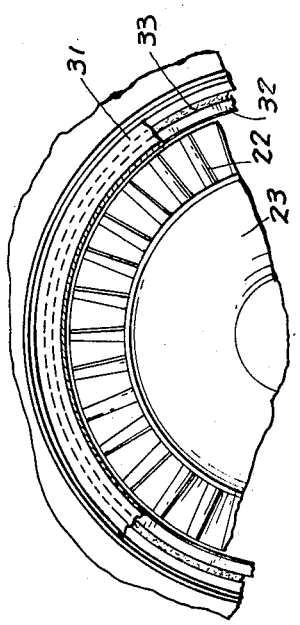
FIG. 2 is a fragmentary sectional view on an enlarged scale taken along the line 2—2 in FIG. 1.

The gas turbine engine embodying the invention comprises a compressor 10 which includes an impeller or rotor 11 that takes air and moves it past stator blades 12 in a general radial direction to a passage 13 and thereafter across a heat exchanger 14 radially inwardly to an annular area surrounding a burner tube 15 that communicates through openings 16, 17 with a combustion area 18. A burner 19 supplies fuel which is mixed with the air and the combustion gases are directed by circumferentially spaced stator blades 20 on a stator assembly 21 against the rotor blades 22 of a turbine rotor 23 that is fixed on a shaft 24. The shaft 24 is rotatably mounted in the frame of the engine by bearings 25, 26. The exhaust gases from the turbine rotor are moved through a passage 27 through the heat exchanger 14 and are exhausted axially outwardly through an outlet 28.

As shown in the drawings, the burner tube 15 is yieldingly urged axially toward the compressor by a coil spring 30. The end of the burner tube 15 includes a flange 31 that frictionally engages a shroud ring 32 surrounding the periphery of the blade tips 22. Shroud ring 32 is mounted for resilient movement, that is, movement radially by an asbestos ring 33 around shroud ring 32 which is positioned in a recess 34 of frame member 35. The ring 32 is made very accurately.

When the engine is not running, the spring 30 frictionally holds the shroud ring 32 against a shoulder 36. When the engine is started and the rotor 23 is getting up to speed, in the event that the shroud ring 32 is not concentric with the rotor 23, it is forced outwardly by the rotor 23 until it assumes a condition of concentricity. It is held in this position by the frictional force of the spring 30.

In addition, since there is a pressure force of the combustion gases on the stator assembly 21 and a lesser pressure force beyond the stator assembly 21 because of the pressure drop across stator vanes 21, an axial force exists that provides the major force which holds the shroud 32 in its adjusted concentric position.

As shown in FIG. 1, the stator blades 20 are hollow and a portion of the air from the compressor passes radially inwardly within the housing of the stator assembly 21 to the area 37 and then out through openings 38 and beyond a deflector 39 to cool the outer surface of the housing of the stator assembly.

It can thus be seen there has been provided an arrangement wherein the shroud ring 32 can be accurately made and will adapt to the concentricity with the turbine rotor without regard to the mounting structure thereof.

I claim:

1. For use in a gas turbine engine comprising a compressor for compressing air, a burner to which the compressor feeds air and where the air is mixed with fuel and burned to form combustion gases, a turbine to which the combustion gases are fed, said turbine comprising a stator and a rotor, the improvement comprising a shroud surrounding the rotor, means for supporting said shroud on said turbine in radial floating relation to said rotor such that at idle and low speed the shroud is free to move by light contact with the rotor blade tips and adjust its concentricity with that of the rotor, and means responsive to the differential pressure across the stator for applying a load to said shroud to hold the shroud in adjusted concentricity at higher speeds.

2. For use in a gas turbine engine comprising a compressor for compressing air, a burner to which the compressor feeds air and where the air is mixed with fuel and burned to form combustion gases, a turbine to which the combustion gases are fed, said turbine comprising a stator and a rotor, the improvement comprising a shroud surrounding the turbine rotor, means for supporting said shroud on said turbine in radial floating relation to said rotor such that at idle and low speed the shroud is free to move and adjust its concentricity with that of the rotor, said last-mentioned means applying a load to said shroud axially of the turbine to frictionally hold it in adjusted concentricity.

3. For use in a gas turbine engine comprising a compressor for compressing air, a burner to which the compressor feeds air and where the air is mixed with fuel and burned to form combustion gases, a turbine to which the combustion gases are fed, said turbine comprising a stator and a rotor, the improvement comprising a shroud surrounding the rotor, means for supporting said shroud on said turbine in floating radial relation to said rotor such that at idle and low speed the shroud is free to move and adjust its concentricity with that of the rotor, a burner tube, and means resiliently urging said burner tube against said shroud to hold said shroud in concentric relation.

4. The combination set forth in claim 3 wherein said last-mentioned means applies an axial load to support said shroud in concentric relation.

5. The combination set forth in claim 3 wherein said burner tube includes means thereon responsive to the differential pressure across said stator of said turbine for applying said load to said shroud for holding said shroud in its adjusted concentricity.

6. In a gas turbine engine, the combination comprising
a compressor for compressing air,
a burner to which the compressor feeds air and where the air is mixed with fuel and burned to form combustion gases,
a turbine to which the combustion gases are fed,
said turbine comprising a stator, a rotor, and a shroud surrounding the rotor,
means for supporting said shroud in radial floating relation to said rotor such that at idle and low speed the shroud is free to move and adjust its concentricity with that of the rotor,
said burner including a burner tube,
means resiliently urging said burner tube against said shroud to hold said shroud in concentric relation.

7. The method of positioning a shroud with relation to a rotor of a gas turbine engine which comprises
yieldingly supporting said shroud at idle and low speeds such that it is free to move radially and adjust its concentricity with that of the rotor,
rotating the rotor to cause the shroud to assume a position of concentricity with respect to the rotor,
and thereafter applying a load to said shroud in an axial direction to hold said shroud in adjusted position.

8. The method of positioning a shroud with relation to a rotor of a gas turbine engine which comprises
yieldingly supporting said shroud at idle and low speeds such that it is free to move radially and adjust its concentricity with that of the rotor,
rotating the rotor to cause the shroud to assume a position of concentricity with respect to the rotor,
and thereafter applying a load to said shroud to hold said shroud in adjusted position,
said step of supporting said shroud including applying an axial load to said shroud to frictionally hold said shroud in concentric relation to said rotor.

* * * * *